(12) United States Patent
Propheter-Hinckley

(10) Patent No.: US 11,203,939 B2
(45) Date of Patent: Dec. 21, 2021

(54) AIRFOIL PLATFORM WITH COOLING ORIFICES

(71) Applicant: United Technologies Corporation, Farmington, CT (US)

(72) Inventor: Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 202 days.

(21) Appl. No.: 16/217,794

(22) Filed: Dec. 12, 2018

(65) Prior Publication Data

US 2020/0190991 A1 Jun. 18, 2020

(51) Int. Cl.
*F01D 5/18* (2006.01)

(52) U.S. Cl.
CPC ............. *F01D 5/187* (2013.01); *F01D 5/186* (2013.01); *F05D 2260/20* (2013.01)

(58) Field of Classification Search
None
See application file for complete search history.

(56) References Cited

U.S. PATENT DOCUMENTS

| | | | |
|---|---|---|---|
| 6,749,396 B2 * | 6/2004 | Barry | F01D 5/186 415/115 |
| 6,887,033 B1 * | 5/2005 | Phillips | F01D 5/147 415/115 |
| 6,893,215 B2 * | 5/2005 | Kuwabara | F01D 11/005 415/115 |
| 7,241,107 B2 | 7/2007 | Spanks, Jr. et al. | |
| 8,201,834 B1 * | 6/2012 | Liang | F01D 11/005 277/637 |
| 8,430,626 B1 | 4/2013 | Liang | |
| 8,794,921 B2 * | 8/2014 | Ellis | F01D 5/187 416/97 R |
| 10,006,367 B2 | 6/2018 | Romanov et al. | |
| 2002/0090296 A1 * | 7/2002 | Kuwabara | F01D 11/005 415/169.1 |
| 2003/0231955 A1 * | 12/2003 | Barry | F01D 5/186 415/115 |
| 2005/0100437 A1 * | 5/2005 | Phillips | F01D 25/12 415/115 |
| 2006/0153681 A1 * | 7/2006 | Lee | F01D 5/145 416/97 R |

(Continued)

FOREIGN PATENT DOCUMENTS

EP 3232001 10/2017

OTHER PUBLICATIONS

European Search Report for European Patent Application No. 19215725.3 completed May 8, 2020.

*Primary Examiner* — Ninh H. Nguyen
*Assistant Examiner* — Jason Fountain
(74) *Attorney, Agent, or Firm* — Carlson, Gaskey & Olds, P.C.

(57) ABSTRACT

An airfoil includes an airfoil section and a platform from which the airfoil section extends. The platform defines a shelf that extends from the airfoil section to a platform edge. The shelf includes a plenum and a plurality of cooling orifices extend from the plenum toward the platform edge. Each of the cooling orifices has a first orifice end that opens to the plenum and a second, closed orifice end adjacent the platform edge.

17 Claims, 5 Drawing Sheets

(56) References Cited

U.S. PATENT DOCUMENTS

| | | | |
|---|---|---|---|
| 2009/0074576 A1* | 3/2009 | Brostmeyer | F01D 5/186 416/95 |
| 2010/0158700 A1 | 6/2010 | Poon et al. | |
| 2011/0189015 A1* | 8/2011 | Shepherd | F01D 5/288 416/95 |
| 2012/0082566 A1* | 4/2012 | Ellis | F01D 5/187 416/97 R |
| 2012/0114868 A1 | 5/2012 | Bunker et al. | |
| 2012/0177479 A1* | 7/2012 | Azad | F01D 9/041 415/115 |
| 2016/0221881 A1 | 8/2016 | Delvaux et al. | |

\* cited by examiner

AIRFOIL PLATFORM WITH COOLING ORIFICES

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines leading and trailing ends and first and second sides that join the leading and trailing ends. The first and second sides span in a longitudinal direction between first and second ends. The airfoil wall circumscribes an internal core cavity. A platform from which the airfoil section extends defines a shelf that extends from the airfoil section to a platform edge. The shelf includes a plenum and a plurality of cooling orifices extending from the plenum toward the platform edge. Each of the cooling orifices have a first orifice end opening to the plenum and a second, closed orifice end adjacent the platform edge.

In a further embodiment of any of the foregoing embodiments, the cooling orifices are straight.

In a further embodiment of any of the foregoing embodiments, the platform defines a bridge passage interconnecting the cooling orifices.

In a further embodiment of any of the foregoing embodiments, the cooling orifices are oriented at an oblique angle to the longitudinal direction.

In a further embodiment of any of the foregoing embodiments, the second, closed ends are tapered.

In a further embodiment of any of the foregoing embodiments, the cooling orifices are perpendicularly oriented to the longitudinal direction.

In a further embodiment of any of the foregoing embodiments, the first ends of the cooling orifices are flared.

In a further embodiment of any of the foregoing embodiments, the second, closed ends of the cooling orifices are tapered.

In a further embodiment of any of the foregoing embodiments, the second, closed ends of the cooling orifices are non-tapered.

In a further embodiment of any of the foregoing embodiments, the platform includes a seal slot overlapping the cooling orifices in the longitudinal direction.

A gas turbine engine according to an example of the present disclosure includes first and second airfoils each having an airfoil section that has an airfoil wall that define leading and trailing ends and first and second sides that join the leading and trailing ends. The first and second sides span in a longitudinal direction between first and second ends. The airfoil wall circumscribes an internal core cavity. A platform from which the airfoil section extends defines a shelf that extends from the airfoil section to first and second platform side edges. The shelf includes a plenum and a plurality of cooling orifices extending from the plenum toward the first platform side edge. Each of the cooling orifices has a first orifice end opening to the plenum and a second, closed orifice end adjacent the first platform side edge. The first platform side edge of the first airfoil is arranged next to the second platform side edge of the second airfoil such that there is a gap between the first platform side edge of the first airfoil and the second platform side edge of the second airfoil.

In a further embodiment of any of the foregoing embodiments, the platform contains no orifices at the second platform side edge.

In a further embodiment of any of the foregoing embodiments, the platform defines a bridge passage interconnecting the cooling orifices.

In a further embodiment of any of the foregoing embodiments, the cooling orifices are oriented at an oblique angle to the longitudinal direction.

In a further embodiment of any of the foregoing embodiments, the first ends of the cooling orifices are flared.

In a further embodiment of any of the foregoing embodiments, the second, closed ends of the cooling orifices are tapered.

In a further embodiment of any of the foregoing embodiments, the platform includes a seal slot overlapping the cooling orifices in the longitudinal direction.

A gas turbine engine according to an example of the present disclosure includes a turbine section that has an airfoil according to any of the foregoing examples.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
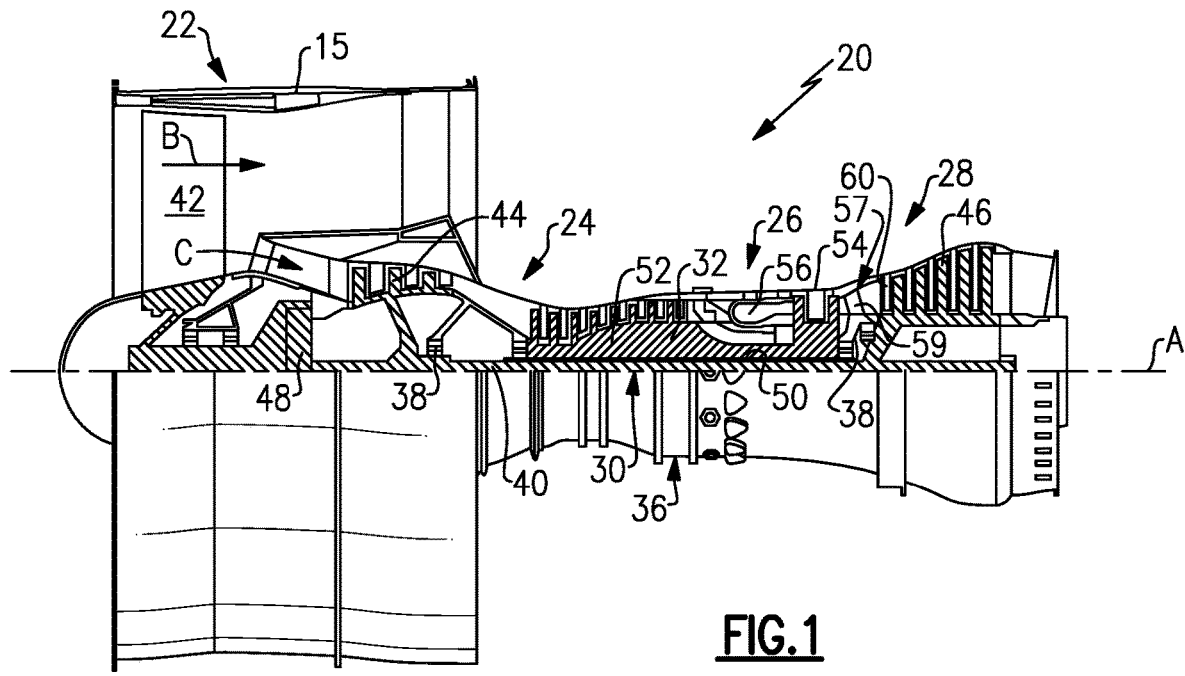
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
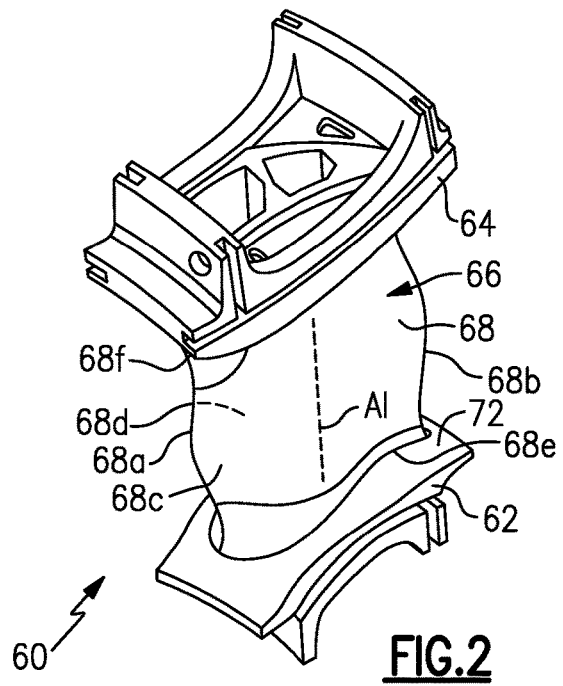
FIG. 2 illustrates an airfoil of the engine of FIG. 1.
Figure 3:
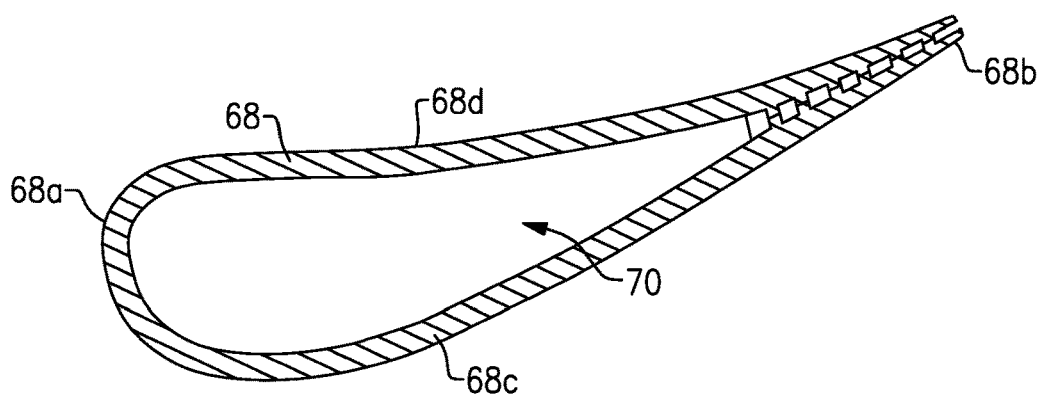
FIG. 3 illustrates a sectioned view of the airfoil of FIG. 3.
Figure 4:
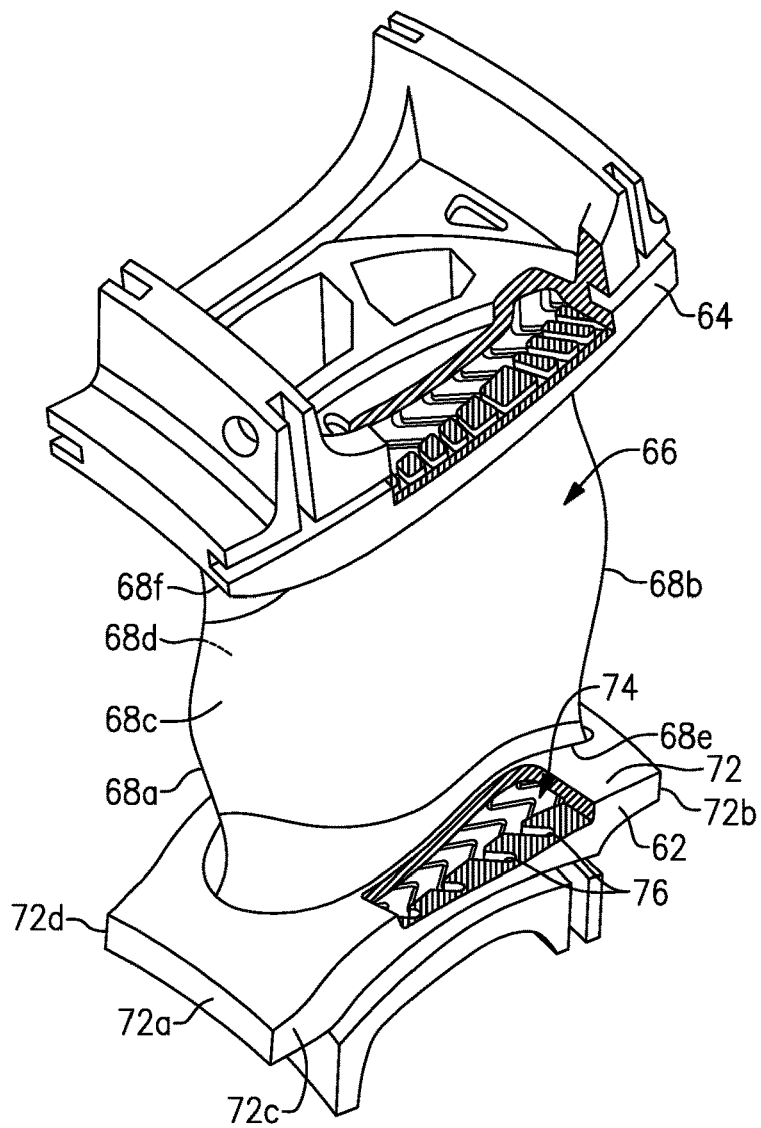
FIG. 4 illustrates a partial cutaway view of the airfoil of FIG. 2.

FIG. 2 illustrates a representative example of a turbine airfoil 60 used in the turbine engine 20 (see also FIG. 1); FIG. 3 illustrates a sectioned view of the airfoil 60; and FIG. 4 shows a partial cutaway view of the airfoil 60. As shown, the turbine airfoil 60 is a turbine vane; however, it is to be understood that, although the examples herein may be described with reference to the turbine vane, this disclosure is also applicable to turbine blades.

The turbine airfoil 60 includes an inner or first platform 62, an outer or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a suction side and the second side 68d is a pressure side. As shown in a sectioned view through the airfoil section 66 in FIG. 3, the outer wall 68 circumscribes an internal core cavity 70. Cooling air may be bled from the compressor section 24 and fed into the internal core cavity 70 to cool the airfoil section 66.

The first platform 62 defines a shelf 72. The shelf 72 generally extends outwards from the base of the airfoil section 66 at the first end 68e. The shelf 72 extends forward from the first end 68e at the leading end 68a of the airfoil section 66 to a platform leading edge 72a, aft from the first end 68e at the trailing end 68b of the airfoil section 66 to a platform trailing edge 72b, laterally from the first end 68e at the first side 68c of the airfoil section 66 to a first platform side edge 72c, and laterally from the first end 68e at the second side 68d of the airfoil section 66 to a second platform side edge 72d. It is to be understood that the second platform 64 may have different aerodynamic contours than the first platform 62 but has substantially the same type of features as the first platform 62. Moreover, although the examples herein may be described with reference to the first platform 62, it is to be appreciated that the examples are also applicable to the second platform 64.

Figure 5:
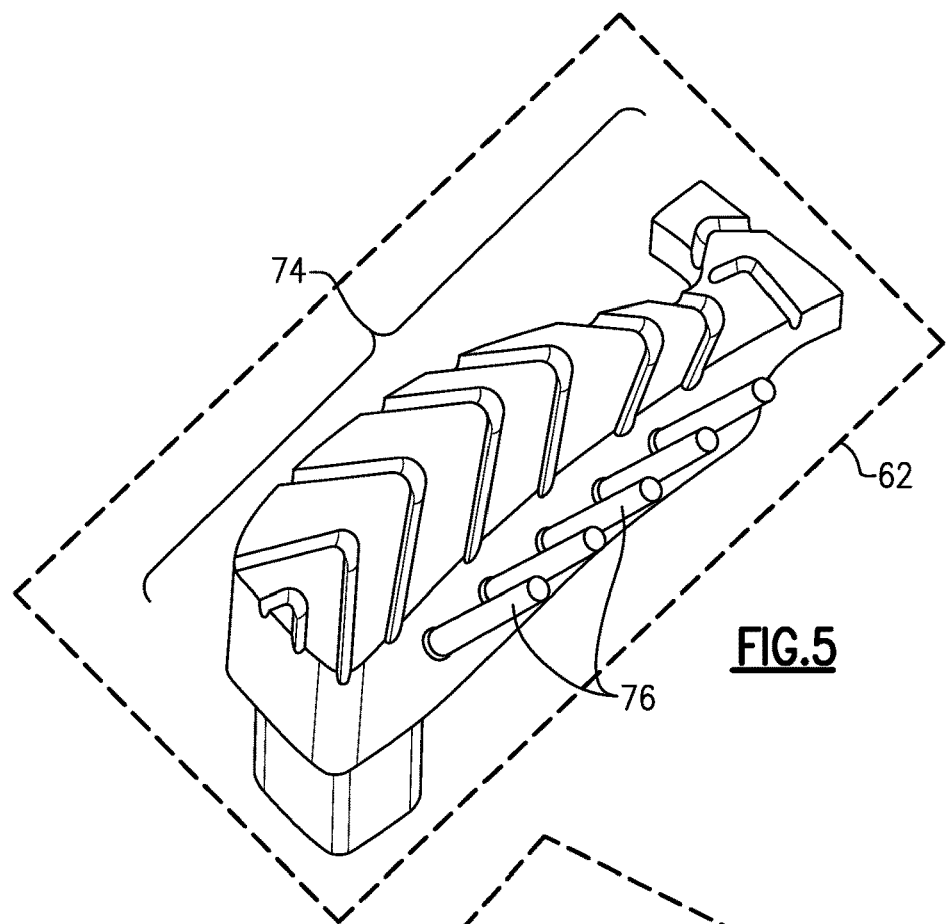
FIG. 5 illustrates a negative view of an example plenum and cooling orifices of a platform.

As depicted in FIG. 4, the shelf 72 includes a plenum 74. The plenum 74 is also represented in FIG. 5, which shows an "inverse" or negative view of the plenum 74. The inverse view is also representative of an investment core that may be used in an investment casting process to form the plenum 74 in the airfoil 60. Most typically, the investment casting core is injection molded from a material that contains ceramic or metal alloy. The investment core is shaped to form the plenum 74. In the inverse view, solid structures of the investment core produce void structures in the plenum 74 and void structures of the investment core produce solid structures in the plenum 74. Thus, the investment core has the negative of the structural features of the platform 62. It is to be understood that although the inverse views presented herein may be used to describe features of the plenum 74 and/or platform 62, each negative view may also represents an investment core and a corresponding cavity in a molding tool that is operable to molding the investment core.

The shelf 72 includes a plurality of cooling orifices 76 that extend from the plenum 74 toward the platform edge. In this example, the platform edge is the first platform side edge 72c. The shelf 72 only contains the cooling orifices 76 on one side such that there are no such orifices on the second platform side edge 72d.

Figure 6A:
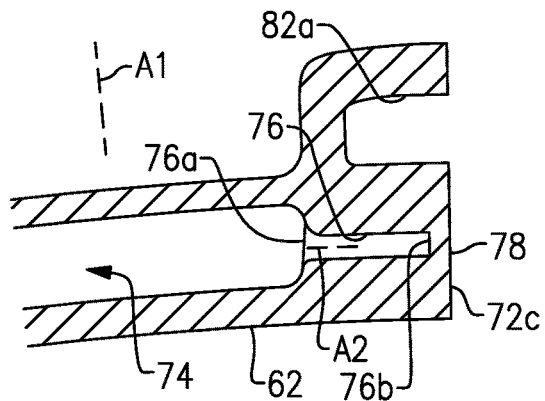
FIG. 6A illustrates a sectioned view through a platform and cooling orifice.
Figure 6B:
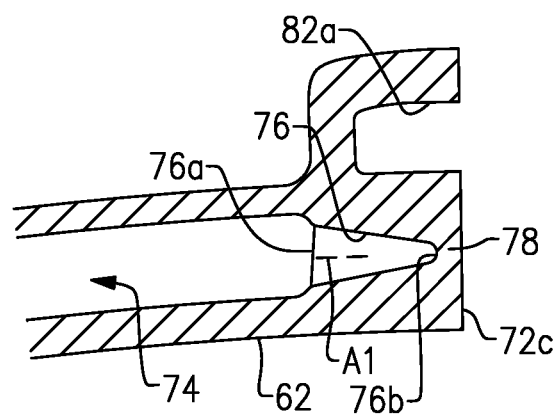
FIG. 6B illustrates an alternate example in which the cooling orifice is tapered.

FIG. 6A illustrates a sectioned view through the platform 62 and a representative one of the cooling orifices 76. The cooling orifice 76 has a first orifice end 76a that opens to the plenum 74 and a second, closed orifice end 76b that is adjacent the first platform side edge 72c. In the example shown, the first orifice end is flared, to facilitate smooth inflow of cooling air into the cooling orifice 76. There is a relatively thin wall segment 78 between the second, closed orifice end 76b and the first platform side edge 72c. As depicted, the cooling orifice 76 is of uniform cross-section along its length. However, as shown in FIG. 6B, the cooling orifice 76 may alternatively be tapered from the first orifice end 76a to the second orifice end 76b.

Figure 7:
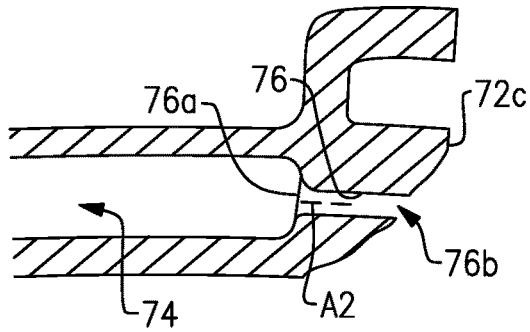
FIG. 7 illustrates the platform of FIG. 6A, but after corrosion to open the end of the cooling orifice.

During operation of the engine 20 cooling air is provided to the airfoil 60. For example, bleed air form the compressor section 24 is provided through the platform 62 into the core cavity 70. The cooling air flows in the plenum 74 prior to flowing into the core cavity 70. However, the thin wall segment 78 blocks the cooling air from flowing through the cooling orifices 76 (although the cooling air may enter and circulate in the cooling orifices 76). Over time, the first platform side edge 72c, which may be formed of metal such as a nickel alloy, may corrode, erode, or both, thereby causing the wall segment 78 to be lost and eventually opening the end 76b of the cooling orifice 76, as depicted in FIG. 7. Once the end 76b is open, the cooling air can then flow through the cooling orifice 76 and is then discharged at the first platform side edge 72c. In the case of the tapered orifice 76 of FIG. 6B, as more of the platform 62 corrodes and is lost, the tapered orifice 76 opens wider to provide a greater amount of cooling air flow until there is enough flow to substantially stop local oxidation.

Figure 8:
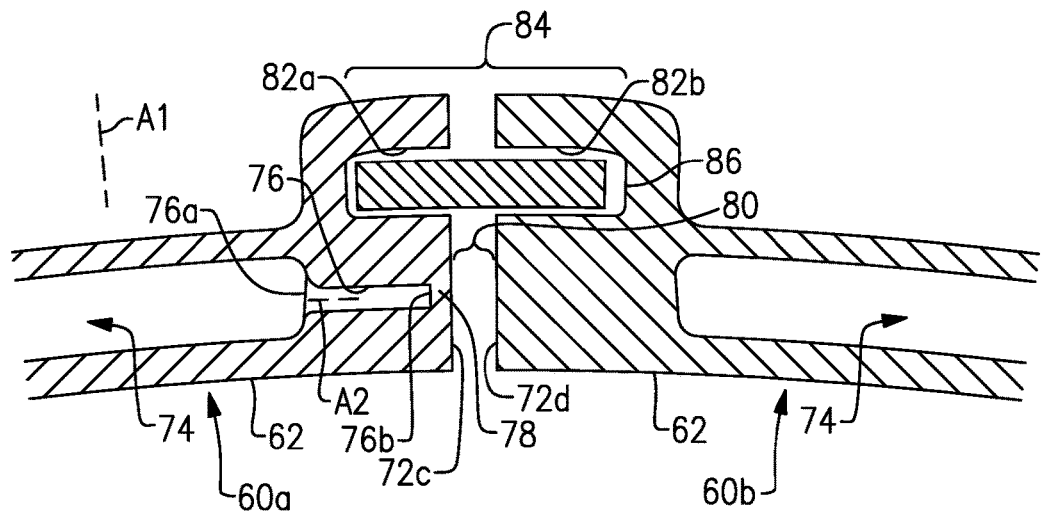
FIG. 8 illustrates a mating interface between two adjacent airfoils.

The configuration of the cooling orifices 76 may be adapted to provide different types of cooling once opened. As an example, FIG. 8 illustrates two of the airfoils, designated at 60a and 60a, arranged next to each other in the engine 20. That is, the first platform side edge 72c of the first airfoil 60a is arranged next to the second platform side edge 72d of the second airfoil 60b such that there is a gap 80 between the edges 72c/72d. Additionally, the first platform side edge 72c includes a first slot portion 82a and the second platform side edge 72d includes a second slot portion 82b. The first seal slot portion 82a is overlapping with the cooling orifice 76 in the longitudinal direction A1. That is, a line parallel to the longitudinal direction A1 intersects both the first seal slot portion 82a and the cooling orifice 76.

The slot portions 82a/82b together form a seal slot 84. A feather seal 86 is disposed in the seal slot 84 and spans across the gap 80. Although not directly in the core gas path, the temperatures in the gap 80 can cause oxidation of the platforms 62, and particularly the edges 72c/72d. However, upon corrosion and loss of the wall segment 78, the cooling orifices 76 open to provide cooling air into the gap 80. The cooling air facilitates the reduction of further oxidation and loss at the edges 72c/72d. For instance, a portion of the cooling air may bleed from the cooling orifice 76 along the edge 72c to provide cooling and/or may jet across the gap 80 to impinge on the edge 72d to provide cooling. In this regard, the cooling orifice 76 is straight in order to jet the cooling air into the gap 80. As an example, the cooling orifice 76 (central orifice axis A2) is perpendicularly oriented to the longitudinal direction A1, and the end 76b is flat (non-tapered). The end 76b may thus substantially completely open once the wall segment 78 is lost.

Figure 9A:
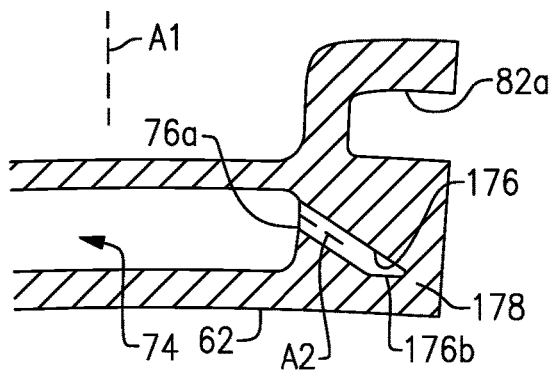
FIG. 9A illustrates a sectioned view through a platform and cooling orifice.
Figure 10:
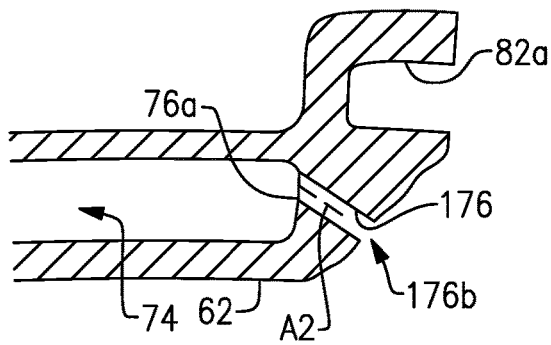
FIG. 10 illustrates the platform of FIG. 9A, but after corrosion to open the end of the cooling orifice.
Figure 9B:
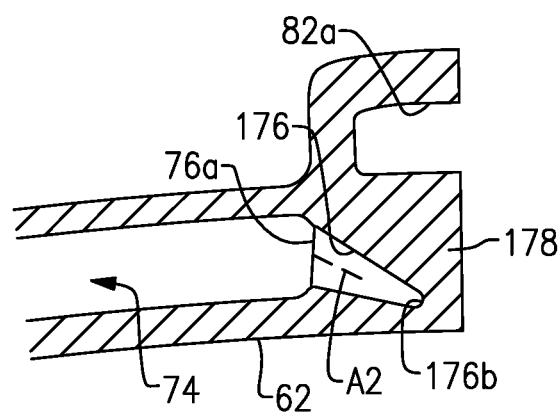
FIG. 9B illustrates an alternate example in which the cooling orifice is tapered.

FIG. 9A illustrates another example of a cooling orifice 176. In this example, the cooling orifice 176 (central orifice axis A2) is obliquely angled to the longitudinal direction A1 and the end 176b is tapered. As an example, the cooling orifice 176 forms an angle between 80° and 30° with a line parallel to the longitudinal direction A1. The cooling orifice 176 (central orifice axis A2) may also be obliquely angled to the engine central axis A. As an example, the cooling orifice 176 forms an angle between 80° and 30° with a line parallel to the engine central axis A. Thus, the cooling orifice 176 may be angled both longitudinally (radially) and axially. However, as shown in FIG. 9B, the cooling orifice 176 may alternatively be tapered from the first orifice end 76a to the second orifice end 176b As depicted in the FIG. 10, once wall segment 178 corrodes and is lost, the end 176b opens. In this example, the bottom surface of the platform 62 in the figure borders the core gas path. The angling of the cooling orifice 176 provides a film of cooling air along the oxidized surface around the end 176b, to facilitate reduction in further oxidation and loss. In the case of the tapered orifice 176 of FIG. 9B, as more of the platform 62 corrodes and is lost, the tapered orifice 176 opens wider to provide a greater amount of cooling air flow until there is enough flow to substantially stop local oxidation.

Figure 11:
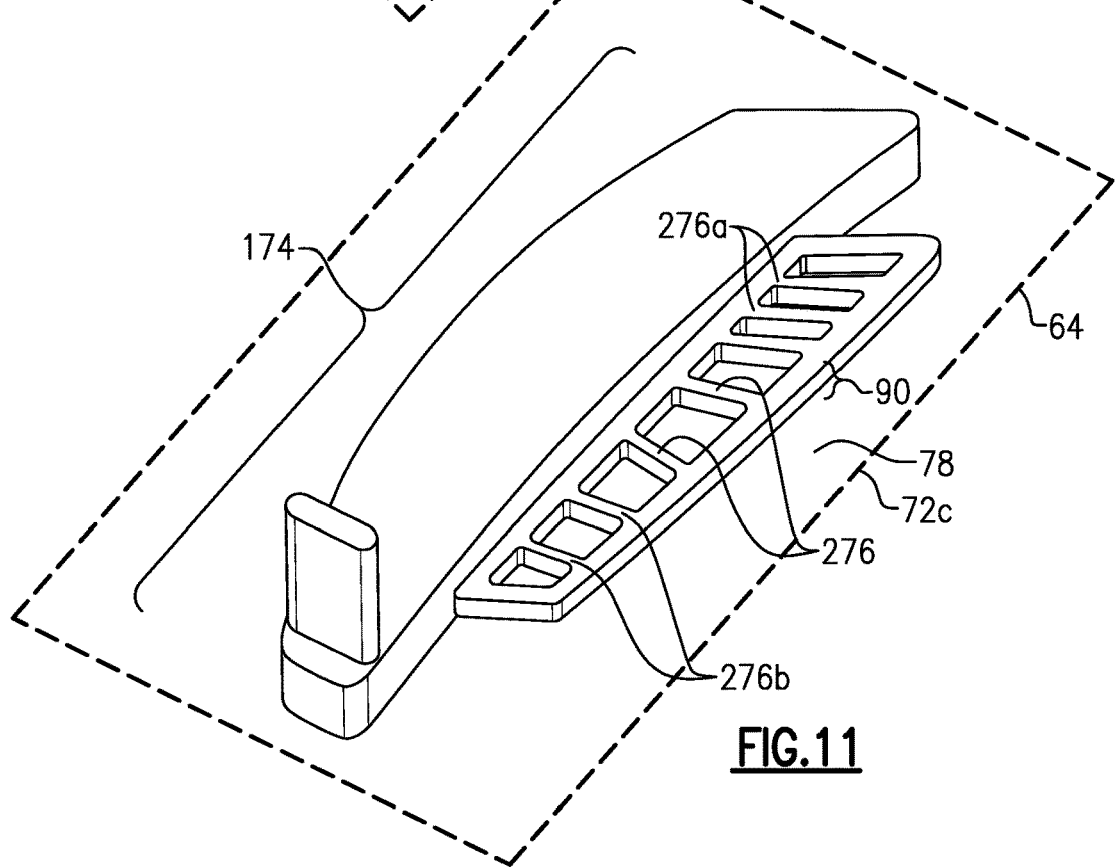
FIG. 11 illustrates a negative view of another example plenum and cooling orifices of a platform.

FIG. 11 illustrates a negative view of another example plenum 174 of the second platform 64, although it is to be understood that the examples below may also be adapted for the first platform 62. In this example, the cooling orifices 276 are interconnected by a bridge passage 90. For example, the bridge passage 90 extends along the first platform side edge 72c and connects the second ends 276b of the cooling orifices 276. In this example, once a portion of the wall segment 78 corrodes and is lost, both the bridge passage 90 and one or more of the cooling orifices 276 are exposed. The opening of one or more of the cooling orifices 276 and the bridge passage 90 provides back side cooling to areas other than the exposed one or ones of the cooling orifices 276, thereby further facilitating the reduction in oxidation. The bridge passage 90 also structurally reinforces the core, making it more robust for handling during manufacturing.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall defining leading and trailing ends and first and second sides joining the leading and trailing ends, the first and second sides spanning in a longitudinal direction between first and second ends, the airfoil wall circumscribing an internal core cavity; and
a platform from which the airfoil section extends, the platform defining a shelf that extends from the airfoil section to a platform edge, the shelf including a plenum and a plurality of cooling orifices extending from the plenum toward the platform edge, each of the cooling orifices having a first orifice end opening to the plenum and a second, closed orifice end adjacent the platform edge, the second, closed ends of the cooling orifices each having a taper, wherein loss of a wall segment at the platform edge during operation results in opening of the second, closed orifice ends.

2. The airfoil as recited in claim 1, wherein the cooling orifices are perpendicularly oriented to the longitudinal direction.

3. The airfoil as recited in claim 1, wherein the first ends of the cooling orifices are flared.

4. The airfoil as recited in claim 1, wherein the platform includes a seal slot overlapping the cooling orifices in the longitudinal direction.

5. The airfoil as recited in claim 1, wherein the platform defines a bridge passage that interconnects the cooling orifices, the bridge passage extending at the closed orifice ends.

6. The airfoil as recited in claim 1, wherein the platform includes a seal slot overlapping the cooling orifices in the longitudinal direction, the cooling orifices are oriented at an oblique angle to the longitudinal direction, and in a direction from the first orifice ends to the second orifice ends the respective cooling orifices are sloped away from the seal slot.

7. The airfoil as recite in claim 1, wherein the cooling orifices are oriented at angle between 80° and 30° with an axial direction about which the airfoil is disposed when in a gas turbine engine.

8. The airfoil as recited in claim 1, wherein each of the cooling orifices is of uniform cross-section from the first orifice end up to the taper.

9. A gas turbine engine comprising:
first and second airfoils each including:
an airfoil section having an airfoil wall defining leading and trailing ends and first and second sides joining the leading and trailing ends, the first and second sides spanning in a longitudinal direction between first and second ends, the airfoil wall circumscribing an internal core cavity,
a platform from which the airfoil section extends, the platform defining a shelf that extends from the airfoil section to first and second platform side edges, the shelf including a plenum and a plurality of cooling orifices extending from the plenum toward the first platform side edge, each of the cooling orifices having a first orifice end opening to the plenum and a second, closed orifice end adjacent the first platform side edge, the second, closed ends of the cooling orifices each having a taper, wherein loss of a wall segment at the first platform side edge during operation results in opening of the second, closed orifice ends,
wherein the first platform side edge of the first airfoil is arranged next to the second platform side edge of the second airfoil such that there is a gap between the first platform side edge of the first airfoil and the second platform side edge of the second airfoil.

10. The gas turbine engine as recited in claim 9, wherein the platform contains no orifices at the second platform side edge.

11. The gas turbine engine as recited in claim 9, wherein the platform defines a bridge passage interconnecting the cooling orifices.

12. The gas turbine engine as recited in claim 9, wherein the cooling orifices are oriented at an oblique angle to the longitudinal direction.

13. The gas turbine engine as recited in claim 9, wherein the first ends of the cooling orifices are flared.

14. The gas turbine engine as recited in claim 9, wherein the platform includes a seal slot overlapping the cooling orifices in the longitudinal direction.

15. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining leading and trailing ends and first and second sides joining the leading and trailing ends, the first and second sides spanning in a longitudinal direction between first and second ends, the airfoil wall circumscribing an internal core cavity, and
a platform from which the airfoil section extends, the platform defining a shelf that extends from the airfoil section to a platform edge, the shelf including a plenum and a plurality of cooling orifices extending from the plenum toward the platform edge, each of the cooling orifices having a first orifice end opening to the plenum and a second, closed orifice end adjacent the platform edge, the second, closed ends of the cooling orifices each having a taper, wherein loss of a wall segment at the platform edge during operation results in opening of the second, closed orifice ends.

16. The gas turbine engine as recited in claim 15, wherein the platform defines a bridge passage interconnecting the cooling orifices.

17. The gas turbine engine as recited in claim 15, wherein the cooling orifices are oriented at an oblique angle to the longitudinal direction.

* * * * *